US012343984B2

(12) United States Patent
Higashi et al.

(10) Patent No.: US 12,343,984 B2
(45) Date of Patent: Jul. 1, 2025

(54) AUXILIARY TAPE CASSETTE INCLUDING CASE HAVING CURVATURE FORMING MEMBER THAT CAUSES PRINTING TAPE TO BE CURVED

(71) Applicant: BROTHER KOGYO KABUSHIKI KAISHA, Nagoya (JP)

(72) Inventors: Kosuke Higashi, Nagoya (JP); Kentaro Murayama, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 184 days.

(21) Appl. No.: 18/190,476

(22) Filed: Mar. 27, 2023

(65) Prior Publication Data

US 2023/0294431 A1 Sep. 21, 2023

Related U.S. Application Data

(63) Continuation of application No. PCT/JP2021/034292, filed on Sep. 17, 2021.

(30) Foreign Application Priority Data

Sep. 30, 2020 (JP) ................................ 2020-164714

(51) Int. Cl.
*B41J 17/30* (2006.01)
*B41J 17/32* (2006.01)

(52) U.S. Cl.
CPC ............... *B41J 17/30* (2013.01); *B41J 17/32* (2013.01)

(58) Field of Classification Search
CPC . B41J 17/30; B41J 17/32; B41J 3/4075; B41J 32/00

(Continued)

(56) References Cited

U.S. PATENT DOCUMENTS 3,672,603 A 6/1972 Swain
3,804,227 A 4/1974 Cappotto et al.
(Continued)

FOREIGN PATENT DOCUMENTS

CN 102092201 A 6/2011
CN 103273748 A 9/2013
(Continued)

OTHER PUBLICATIONS

International Preliminary Report On Patentability and English language Written Opinion of the International Search Report for PCT/JP2021/034292 dated Mar. 28, 2023.

(Continued)

*Primary Examiner* — Jason S Uhlenhake
*Assistant Examiner* — Alexander D Shenderov
(74) *Attorney, Agent, or Firm* — KENEALY VAIDYA LLP

(57) ABSTRACT

An auxiliary tape cassette includes: an auxiliary tape; and a case. The auxiliary tape is used for printing on a printing tape. The case accommodates therein at least a part of the auxiliary tape. The case has: a discharge opening; and a guide part. The discharge opening discharges the printing tape to an outside. The guide part guides the printing tape supplied from an outside of the case toward the discharge opening. The guide part has a curvature forming member that causes the printing tape to be curved such that a portion in a width direction of the printing tape is distended in a thickness direction by contacting the printing tape.

11 Claims, 10 Drawing Sheets

(58) Field of Classification Search
USPC .......................................................... 347/214
See application file for complete search history.

(56) References Cited

U.S. PATENT DOCUMENTS

| | | | | |
|---|---|---|---|---|
| 3,823,808 | A * | 7/1974 | Murata | G06C 11/12 400/615.2 |
| 3,948,382 | A | 4/1976 | Nesbitt et al. | |
| 4,034,935 | A | 7/1977 | Plaza et al. | |
| 4,252,450 | A | 2/1981 | Goodman et al. | |
| 4,351,619 | A | 9/1982 | Duke et al. | |
| 4,397,574 | A | 8/1983 | Wojdyla | |
| 4,402,619 | A | 9/1983 | Paque et al. | |
| 4,490,059 | A | 12/1984 | Daughters | |
| 4,499,513 | A | 2/1985 | Umeda | |
| 4,538,931 | A | 9/1985 | Nagashima | |
| 4,565,128 | A | 1/1986 | Moriyama et al. | |
| 4,598,780 | A | 7/1986 | Iwasaki et al. | |
| 4,668,961 | A | 5/1987 | Hiramatsu | |
| 4,832,514 | A | 5/1989 | Basile | |
| 4,856,921 | A | 8/1989 | Hatakeyama | |
| 5,099,378 | A | 3/1992 | Turgeon | |
| 5,145,268 | A | 9/1992 | Cavallini | |
| 5,325,114 | A | 6/1994 | Fogle et al. | |
| 5,355,152 | A | 10/1994 | Porter et al. | |
| 5,402,954 | A | 4/1995 | Skavnak et al. | |
| 5,435,657 | A | 7/1995 | Pearce et al. | |
| 5,472,286 | A | 12/1995 | Uemura et al. | |
| 5,619,244 | A * | 4/1997 | Manna | B41J 33/52 347/214 |
| 5,620,268 | A | 4/1997 | Yamaguchi et al. | |
| 5,645,360 | A | 7/1997 | Iwane et al. | |
| 5,727,888 | A | 3/1998 | Sugimoto et al. | |
| 5,917,532 | A | 6/1999 | Cornell et al. | |
| 5,959,652 | A | 9/1999 | Privin | |
| 6,511,238 | B1 | 1/2003 | Glize | |
| 2007/0172286 | A1 | 7/2007 | Pomfret | |
| 2008/0084494 | A1 | 4/2008 | Pomfret | |
| 2014/0307038 | A1* | 10/2014 | Niizeki | B41J 15/044 347/214 |
| 2015/0014474 | A1* | 1/2015 | Hirabayashi | B65H 23/0322 242/615.3 |
| 2015/0029282 | A1* | 1/2015 | Hirabayashi | B41J 11/0045 242/615.3 |
| 2020/0406647 | A1* | 12/2020 | Hokari | B41J 15/044 |
| 2022/0016915 | A1 | 1/2022 | Ishimoto et al. | |

FOREIGN PATENT DOCUMENTS

| | | | |
|---|---|---|---|
| EP | 0414544 | A2 | 2/1991 |
| GB | 2016411 | A | 9/1979 |
| JP | S50-36734 | B1 | 11/1975 |
| JP | S54-111914 | A | 9/1979 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | A | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y | 10/1990 |
| JP | H03-97181 | A | 4/1991 |
| JP | H03-284973 | A | 12/1991 |
| JP | H04-046063 | U1 | 4/1992 |
| JP | H04-152176 | A | 5/1992 |
| JP | H05-000459 | U1 | 1/1993 |
| JP | H05-41834 | U | 6/1993 |
| JP | H05-53956 | U | 7/1993 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-183204 | A | 7/1996 |
| JP | H08-183232 | A | 7/1996 |
| JP | H09-156188 | A | 6/1997 |
| JP | H10-194254 | A | 7/1998 |
| JP | 2000-103149 | A | 4/2000 |
| JP | 2001-047713 | A | 2/2001 |
| JP | 2002-211092 | A | 7/2002 |
| JP | 2007-502221 | A | 2/2007 |
| JP | 2008-261968 | A | 10/2008 |
| JP | 2009-196804 | A | 9/2009 |
| JP | 2011-148167 | A | 8/2011 |
| JP | 2011-150007 | A | 8/2011 |
| JP | 2014-008661 | A | 1/2014 |
| JP | 2014-170142 | A | 9/2014 |
| JP | 2020-104324 | A | 7/2020 |
| WO | 2005/018944 | A1 | 3/2005 |

OTHER PUBLICATIONS

International Search Report for PCT/JP2021/034292 dated Nov. 22, 2021.

* cited by examiner

AUXILIARY TAPE CASSETTE INCLUDING CASE HAVING CURVATURE FORMING MEMBER THAT CAUSES PRINTING TAPE TO BE CURVED

REFERENCE TO RELATED APPLICATIONS

This is a by-pass continuation application of International Application No. PCT/JP2021/034292 filed Sep. 17, 2021 claiming priority from Japanese Patent Application No. 2020-164714 filed Sep. 30, 2020. The entire contents of the International Application and the priority application are incorporated herein by reference.

BACKGROUND ART

With a printing device that performs printing on a printing tape, cassettes that accommodates therein a printing tape are attached to and detached from a printing device body to replace and supply a printing tape. A prior art discloses a cassette in which an ink ribbon cassette that accommodates therein an ink ribbon and a printing tape cassette that accommodates therein a printing tape are stacked.

DESCRIPTION

In the cassette described above, the printing tape needs to be inserted into the ink ribbon cassette through a film gate to be superimposed on the ink ribbon. However, since a printing tape is long and flexible, there may be cases in which insertion of the printing tape into an ink ribbon cassette is not easy.

In view of the foregoing, it is an object of the present disclosure to provide an auxiliary tape cassette into which insertion of a printing tape can be performed relatively easily.

In order to attain the above and other object, the present disclosure provides an auxiliary tape cassette including: an auxiliary tape; and a case. The auxiliary tape is used for printing on a printing tape. The case accommodates therein at least a part of the auxiliary tape. The case has: a discharge opening; and a guide part. The discharge opening discharges the printing tape to an outside. The guide part guides the printing tape supplied from an outside of the case toward the discharge opening. The guide part has a curvature forming member that causes the printing tape to be curved such that a portion in a width direction of the printing tape is distended in a thickness direction by contacting the printing tape.

In the above configuration, since the printing tape is curved such that a portion in the width direction of the printing tape is distended by the curvature forming member, a secondary moment in a cross section orthogonal to a longitudinal direction of the printing tape increases. As a result, rigidity of the printing tape is improved, thereby enabling insertion of the printing tape to an inside of the auxiliary tape cassette to be performed relatively easily.

1. FIRST EMBODIMENT

1-1. Configuration

Figure 1:
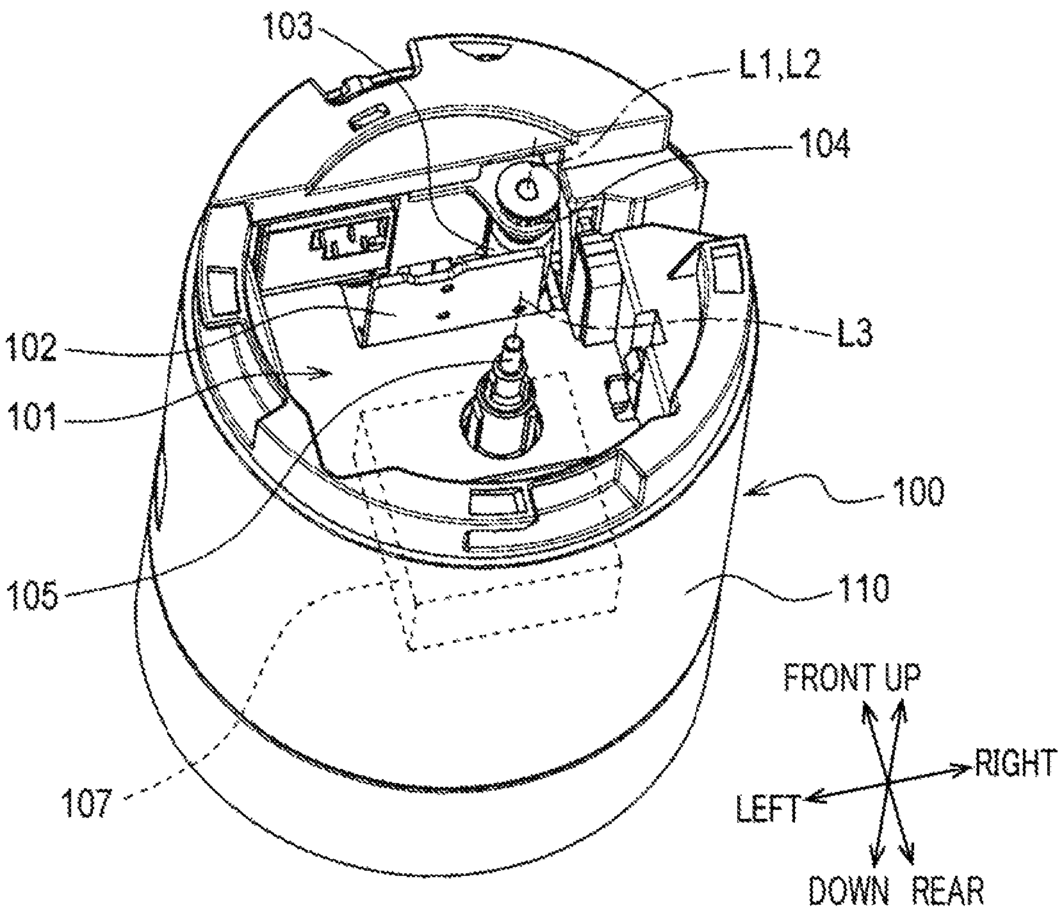
FIG. 1 is a schematic perspective view illustrating a printing device body.
Figure 2A:
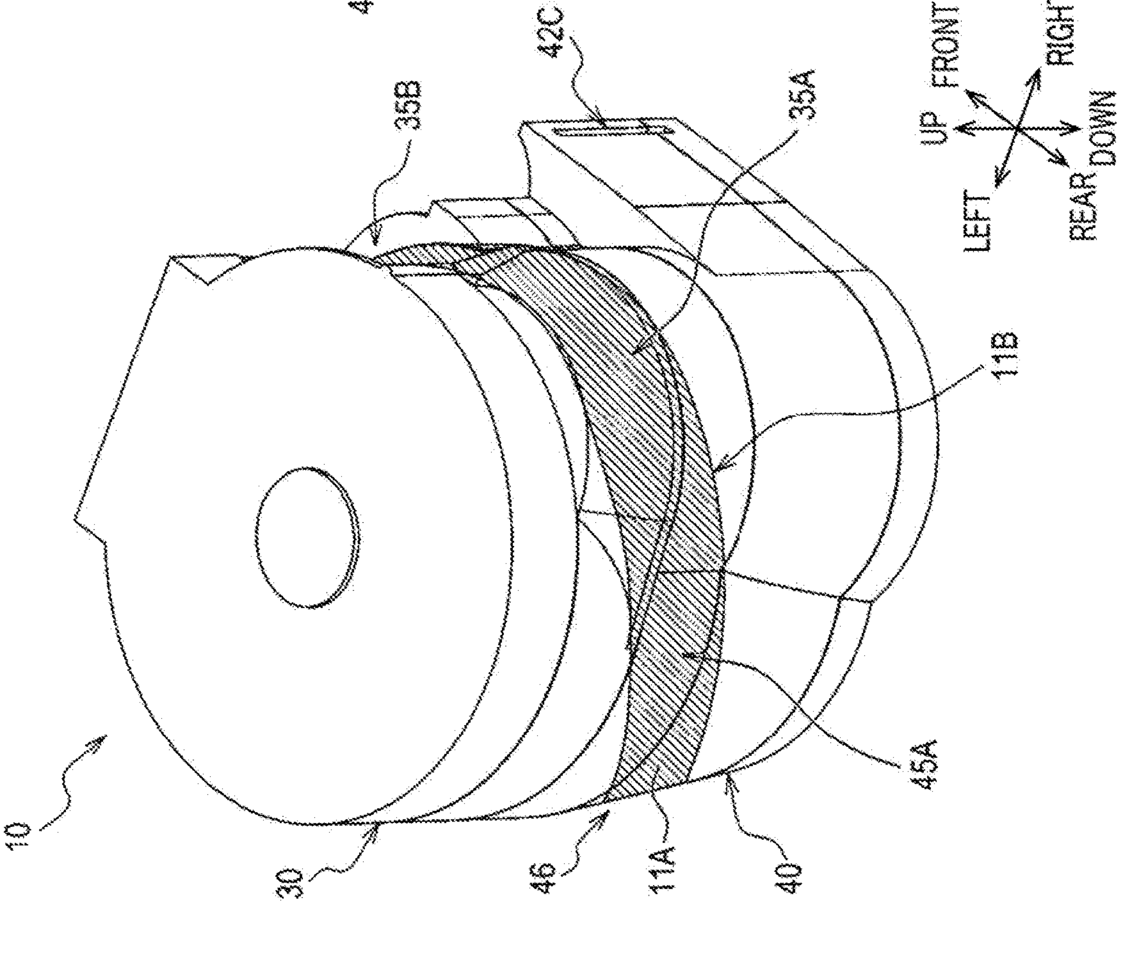
FIGS. 2A and 2B are schematic perspective views of a printing cassette.
Figure 2B:
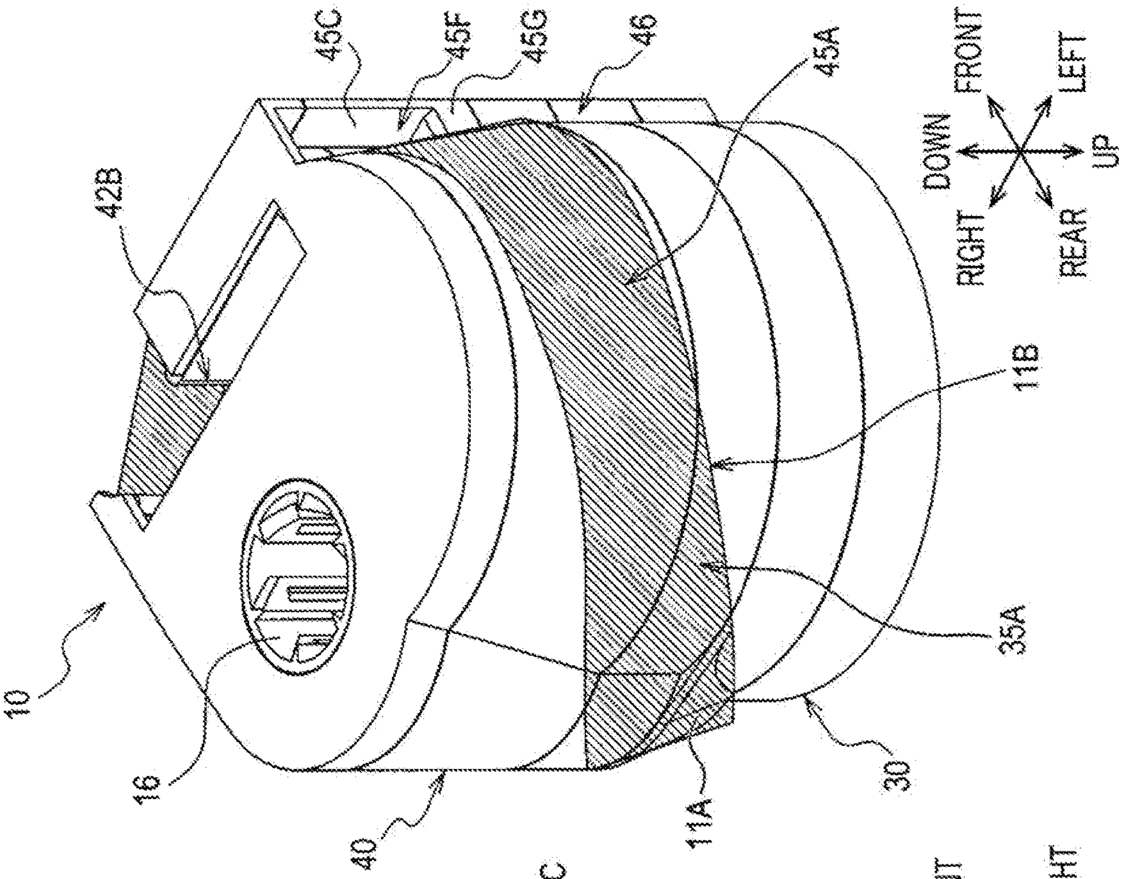

A printing device body 100 illustrated in FIG. 1 consists a printing device together with a printing cassette 10 illustrated in FIGS. 2A and 2B. This printing device is a device that performs printing on a tape-like printing medium.

In the present embodiment, an axial direction of an output gear 21 will be referred to as an up-down direction, a direction orthogonal to the up-down direction in which the output gear 21 and a take-up spool 16 are arranged will be referred to as a front-rear direction, and a direction orthogonal to both the up-down direction and the front-rear direction will be referred to as a left-right direction.

<Printing Device Body>

As illustrated in FIG. 1, the printing device body 100 includes a cassette accommodation part 101, a printing head 102, a platen roller 103, a platen gear 104, a drive shaft 105, a drive source 107, and a housing 110.

(Cassette Accommodation Part)

The cassette accommodation part 101 is a recess in which the printing cassette 10 is mounted. The cassette accommodation part 101 functions to position the printing cassette 10. The cassette accommodation part 101 is provided in the housing 110.

(Printing Head)

The printing head 102 is disposed inside the cassette accommodation part 101. The printing head 102 has a plurality of heating elements whose heat generation is individually controlled.

(Platen Roller)

The platen roller 103 is disposed inside the cassette accommodation part 101 near the printing head 102 so as to oppose the printing head 102. The platen roller 103 is pivotally movable in a direction toward or away from the printing head 102. A rotational axis L1 of the platen roller 103 is parallel to the up-down direction.

(Platen Gear)

The platen gear 104 is coupled to the platen roller 103. In the present embodiment, a rotational axis L2 of the platen gear 104 is arranged on the same line as the rotational axis L1 of the platen roller 103. The platen gear 104 is pivotally movable together with the platen roller 103.

(Drive Shaft)

The drive shaft 105 is inserted into the take-up spool 16 and an input gear 22 in the printing cassette 10. The drive shaft 105 rotates the take-up spool 16 and the input gear 22.

The drive shaft 105 is disposed inside the cassette accommodation part 101. A rotational axis L3 of the drive shaft 105 is parallel to the up-down direction. The drive shaft 105 is rotated about the rotational axis L3 by the drive source 107.

(Drive Source)

The drive source 107 drives the drive shaft 105 to rotate. A mechanism in which a motor and gears are combined, for example, can be used as the drive source 107.

<Printing Cassette>

The printing cassette 10 illustrated in FIGS. 2A and 2B includes a printing medium (i.e., a printing tape 11A). The printing cassette 10 is attachable to and detachable from the printing device body 100. By replacing the printing cassette 10, the printing medium can be replenished and the type of printing medium (e.g., the size, color, material, etc.) can be changed.

The printing cassette 10 includes a printing tape cassette 30, and an auxiliary tape cassette 40. The printing cassette 10 is attached to the printing device body 100 while the printing tape cassette 30 and the auxiliary tape cassette 40 are coupled to each other.

(Printing Tape Cassette)

Figure 3A:
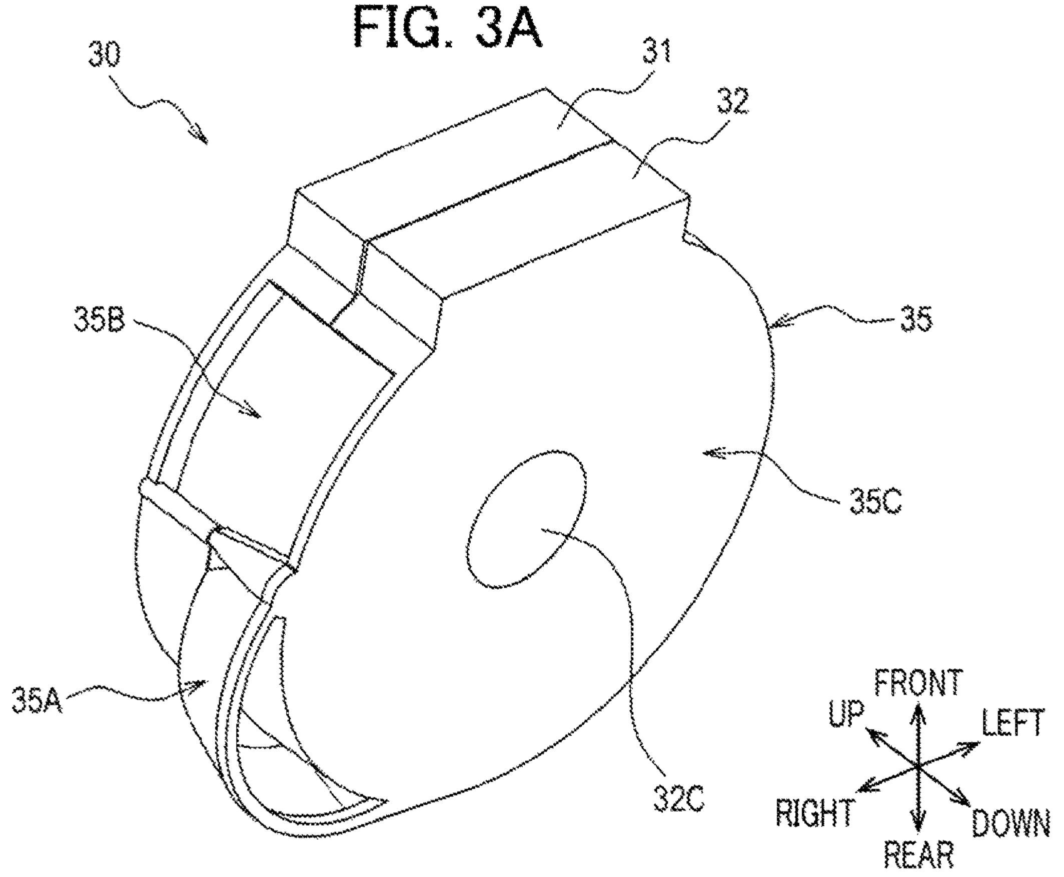
FIGS. 3A and 3B are schematic perspective views of a printing tape cassette of FIG. 2A.
Figure 3B:
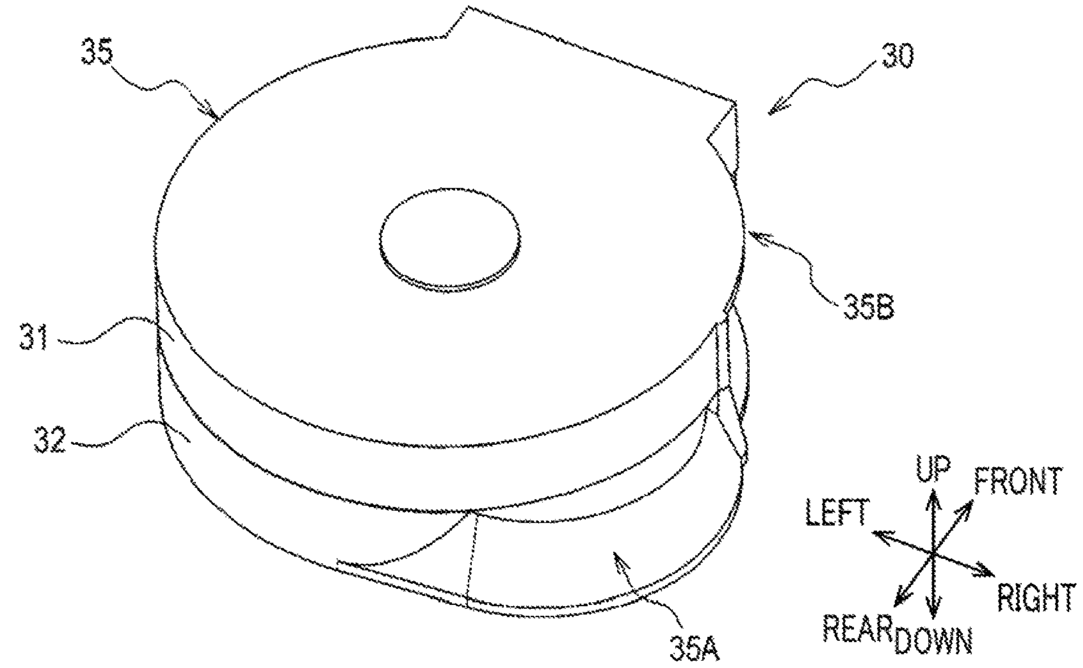
Figure 4:
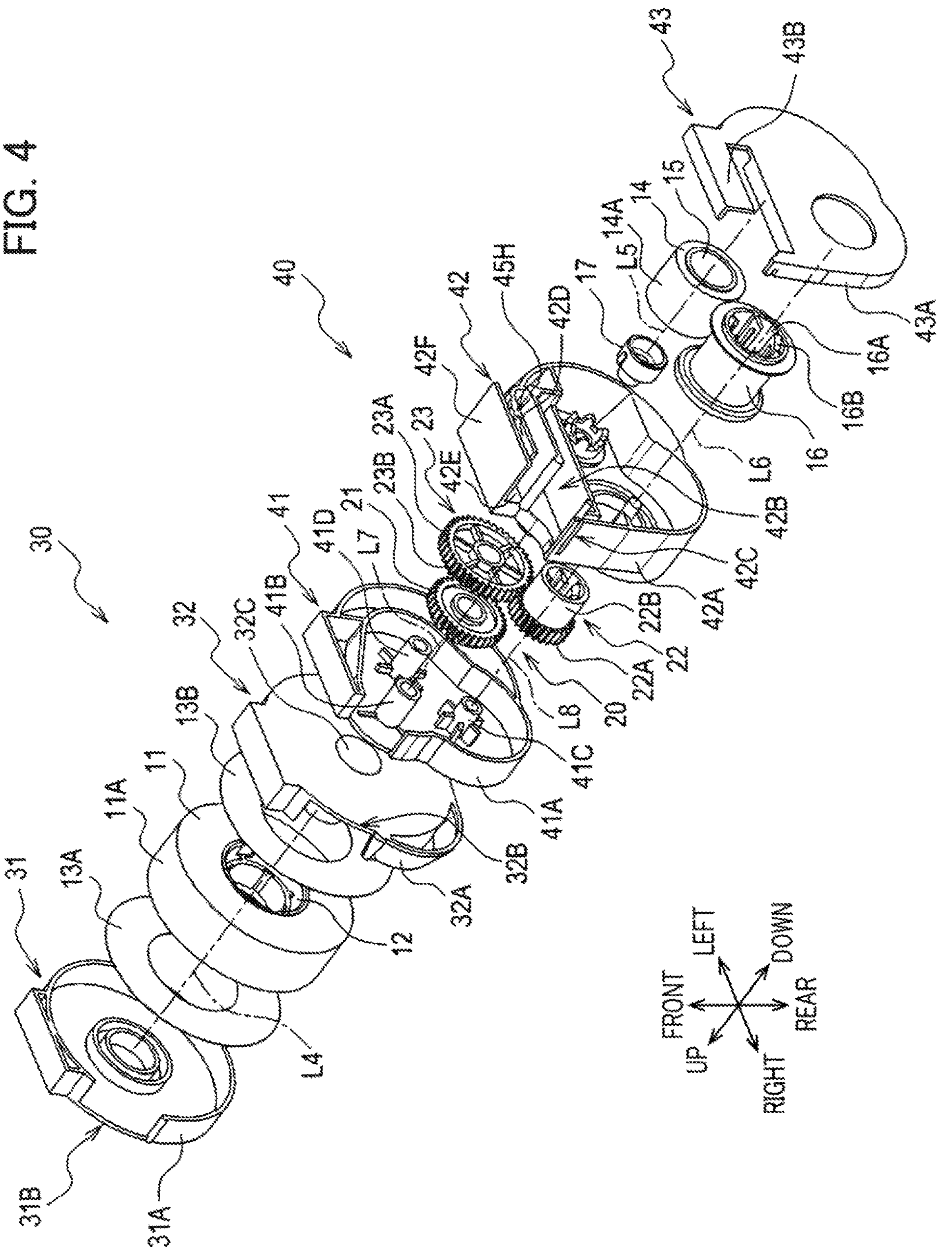
FIG. 4 is a schematic exploded perspective view of the printing cassette of FIG. 2A.

The printing tape cassette 30 illustrated in FIGS. 3A and 3B includes a printing tape case 35 that accommodates therein at least a part of the printing tape 11A. As illustrated in FIG. 4, the printing tape cassette 30 also includes a printing tape roll 11, a first supply spool 12, and spacer films 13A and 13B.

(Printing Tape Roll)

The printing tape roll 11 is configured of the printing tape 11A subjected to printing wound around the first supply spool 12. Printing is performed on a surface of the printing tape 11A by the printing head 102 in the printing device body 100 and an ink ribbon 14A (an example of the auxiliary tape).

The two spacer films 13A and 13B are disposed on respective outer sides of the printing tape roll 11 in the up-down direction so as to interpose the printing tape roll 11 therebetween. The spacer films 13A and 13B are disposed between the printing tape roll 11 and a first case part 31 and between the printing tape roll 11 and a second case part 32, respectively.

(First Supply Spool)

The first supply spool 12 is rotatable about a rotational axis L4. The first supply spool 12 supplies the printing tape 11A to the printing head 102 by rotating in accordance with conveyance of the printing tape 11A by the platen roller 103 of the printing device body 100. The rotational axis L4 of the first supply spool 12 is parallel to the up-down direction and is coincident with a winding axis of the printing tape roll 11.

(Printing Tape Case)

The printing tape case 35 has the first case part 31, the second case part 32, a first guide surface 35A (see FIGS. 3A and 3B), and a first discharge opening 35B (see FIGS. 3A and 3B).

The first case part 31 constitutes an upper end portion of the printing tape case 35. The second case part 32 constitutes a lower end portion of the printing tape case 35. The second case part 32 is disposed below the first case part 31 and is coupled to the first case part 31 in the up-down direction. The printing tape roll 11 is disposed in a space enclosed by the first case part 31 and the second case part 32.

The first case part 31 has a first side wall 31A, and a first notch 31B. The second case part 32 has a second side wall 32A, a second notch 32B, and a first positioning part 32C.

Among outer surfaces of the printing tape case 35, the first side wall 31A and the second side wall 32A constitute a side surface that circumferentially surrounds the printing tape roll 11. The first notch 31B is provided in a front portion of the first side wall 31A. The second notch 32B is provided in a front portion of the second side wall 32A. The first notch 31B and the second notch 32B are coupled together to constitute the first discharge opening 35B for the printing tape 11A.

As illustrated in FIGS. 2A and 2B, a part of the side surface of the printing tape case 35 constitutes the first guide surface 35A, which guides the printing tape 11A that has been discharged through the first discharge opening 35B of the printing tape case 35.

The first discharge opening 35B is provided in the side surface of the printing tape case 35 for discharging the printing tape 11A out of the printing tape case 35. The printing tape 11A that has been discharged through the first discharge opening 35B in a radial direction of the printing tape roll 11 is conveyed downward from the first discharge opening 35B (i.e., toward the auxiliary tape cassette 40) while being wound around the first guide surface 35A in a spiral shape having a central axis that is parallel to the up-down direction.

As illustrated in FIG. 3A, the first positioning part 32C is a hole provided in a first coupling surface 35C of the printing tape case 35. The first coupling surface 35C is a surface that opposes and contacts the auxiliary tape cassette 40 positioned below the printing tape case 35 when the printing tape case 35 has been inserted into the cassette accommodation part 101. The first positioning part 32C positions the printing tape case 35 relative to the auxiliary tape cassette 40. A second positioning part 41E on the auxiliary tape cassette 40 is inserted into the first positioning part 32C.

Among the outer surfaces of the printing tape case 35, the first coupling surface 35C is a flat surface that crosses (specifically, that is orthogonal to) the up-down direction. The auxiliary tape cassette 40 can be arranged on the first coupling surface 35C.

(Auxiliary Tape Cassette)

Figure 5A:
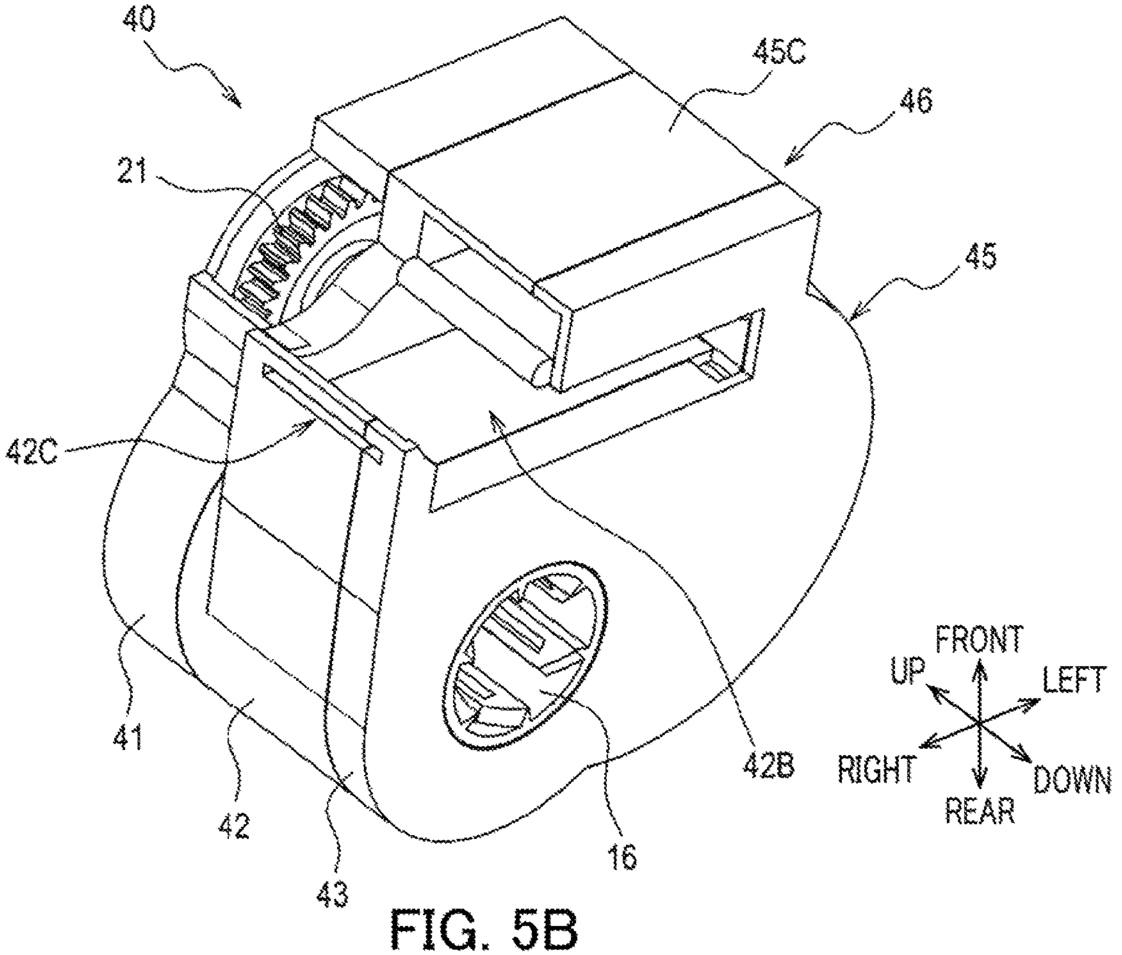
FIGS. 5A and 5B are schematic perspective views of an auxiliary tape cassette of FIG. 2A.
Figure 5B:
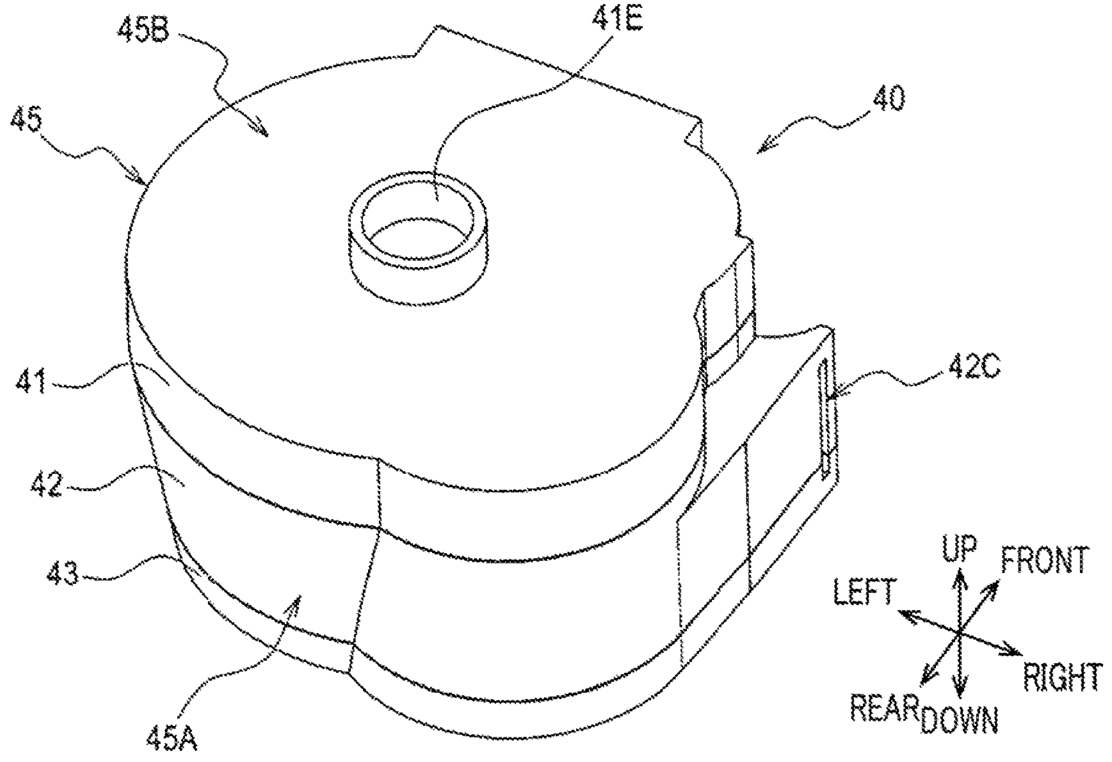

The auxiliary tape cassette 40 illustrated in FIGS. 5A and 5B is attachable to and detachable from the printing tape cassette 30. The auxiliary tape cassette 40 includes an auxiliary tape case 45 (an example of the case) that accommodates therein at least a part of the ink ribbon 14A and at least a part of a drive transmission unit 20.

The auxiliary tape cassette 40 in the present embodiment also serves as a gear cassette that accommodates therein gears. As illustrated in FIG. 4, the auxiliary tape cassette 40 includes an ink ribbon roll 14, a second supply spool 15, the take-up spool 16, a clutch spring holder 17, and the drive transmission unit 20.

(Ink Ribbon Roll)

The ink ribbon roll 14 is configured of the ink ribbon 14A wound around the second supply spool 15. The ink ribbon 14A is used for printing on the printing tape 11A.

The ink ribbon 14A is superimposed on the printing tape 11A being conveyed at a head opening 42B and is used for printing by the printing head 102. The ink ribbon 14A that has been used for printing is taken up by the take-up spool 16.

Rotational resistance is applied to the ink ribbon roll 14 by a clutch spring (not illustrated) held in the clutch spring holder 17. At least a part of the ink ribbon roll 14 is disposed in a position that is overlapped with the printing tape roll 11 in the up-down direction.

(Second Supply Spool)

The second supply spool 15 is rotatable about a rotational axis L5. The rotational axis L5 of the second supply spool 15 is parallel to the rotational axis L4 of the first supply spool 12, i.e., is parallel to the up-down direction, and is coincident with a winding axis of the ink ribbon roll 14. The second supply spool 15 supplies the ink ribbon 14A to the head opening 42B by rotating as the take-up spool 16 takes up the ink ribbon 14A.

(Take-Up Spool)

The take-up spool 16 is rotatable about a rotational axis L6. The rotational axis L6 of the take-up spool 16 is parallel to the rotational axis L5 of the second supply spool 15.

The take-up spool 16 is a cylindrical to have a hollow part defined by an inner circumferential surface 16A. Splines 16B are provided on the inner circumferential surface 16A of the take-up spool 16. The drive shaft 105 of the printing device body 100 is coupled to the splines 16B. The take-up spool 16 is rotated by the drive shaft 105 to take up the ink ribbon 14A that has been used for printing.

(Drive Transmission Unit)

When a printing cassette 10 has been attached to the printing device body 100, the drive transmission unit 20 transmits a driving force of the drive source 107 transmitted through the drive shaft 105 to the platen roller 103 and rotates the platen roller 103 at a rotational speed set for the respective printing cassettes 10.

The drive transmission unit 20 includes the output gear 21, the input gear 22, and an idle gear 23. The drive transmission unit 20 is disposed further upward than the ink ribbon roll 14 (i.e., near the printing tape cassette 30). In other words, the output gear 21 and the input gear 22 are arranged in the auxiliary tape case 45 to be spaced apart from the ink ribbon roll 14 in the up-down direction.

(Output Gear)

The output gear 21 is an external gear provided for outputting a driving force used for conveying the printing tape 11A to an outside. Specifically, the output gear 21 transmits the driving force from an outside to the platen gear 104 of the printing device body 100. A rotational axis L7 of the output gear 21 is parallel to the rotational axis L5 of the second supply spool 15. A part of the output gear 21 is exposed to a space that communicates with the head opening 42B.

The output gear 21 engages with the platen gear 104 at the space communicating with the head opening 42B while the printing cassette 10 is attached to the printing device body 100 (i.e., while the auxiliary tape case 45 is accommodated in the cassette accommodation part 101).

(Input Gear)

The input gear 22 indirectly engages with the output gear 21 via the idle gear 23 and transmits a driving force to the output gear 21.

The input gear 22 has an external gear 22A, and a spool 22B. The spool 22B is fixed to one side surface of the external gear 22A. The spool 22B is a cylindrical internal gear with splines provided on an inner circumferential surface thereof. The external gear 22A is rotated integrally with the spool 22B by the driving force of the drive source 107 inputted into the spool 22B.

A rotational axis L8 of the input gear 22 (i.e., a rotational axis of the external gear 22A and a rotational axis of the spool 22B) is arranged on the same line as the rotational axis L6 of the take-up spool 16. At least a part of the input gear 22 is disposed at a position overlapped with the printing tape roll 11 in the up-down direction.

The rotational axis L8 of the input gear 22 is overlapped with the hollow part of the take-up spool 16 in the up-down direction. Also, a lower end portion of the spool 22B in the input gear 22 is inserted into the hollow part of the take-up spool 16 from above.

Therefore, the drive shaft 105 is simultaneously inserted into the take-up spool 16 and the input gear 22 in a state where the printing cassette 10 is attached to the printing device body 100. As a result, the input gear 22, although not directly coupled to the take-up spool 16, is rotated together with the take-up spool 16 by the drive shaft 105.

(Idle Gear)

The idle gear 23 is drivingly coupled to (i.e., engages with) the input gear 22 and the output gear 21, and transmits a driving force inputted into the input gear 22 to the output gear 21. Hence, the drive shaft 105 inputs a driving force into the output gear 21 indirectly via the input gear 22 and the idle gear 23.

The idle gear 23 is a stepped gear having an upstream gear 23A engaging with the input gear 22, and a downstream gear 23B engaging with the output gear 21. The upstream gear 23A and the downstream gear 23B are coaxially juxtaposed with each other. The downstream gear 23B has a diameter smaller than the upstream gear 23A. Further, the downstream gear 23B is arranged closer to the printing tape cassette 30 than the upstream gear 23A is to the printing tape cassette 30 in the up-down direction (i.e., above the downstream gear 23B).

The idle gear 23 transmits the driving force inputted into the input gear 22 to the output gear 21 after reducing a rotational speed of the driving force. That is, the drive transmission unit 20 includes a reduction mechanism whose reduction ratio is a transmission ratio obtained by dividing a rotational speed of the input gear 22 by a rotational speed of the output gear 21.

(Auxiliary Tape Case)

The auxiliary tape case 45 has a third case part 41, a fourth case part 42, a fifth case part 43, and a guide part 46 (see FIG. 5A).

The third case part 41 constitutes an upper end portion of the auxiliary tape case 45. The fifth case part 43 constitutes a lower end portion of the auxiliary tape case 45. The fourth case part 42 is arranged below the third case part 41 and above the fifth case part 43, and is coupled to the third case part 41 and the fifth case part 43 in the up-down direction.

The ink ribbon roll 14, the second supply spool 15, and the take-up spool 16 are disposed in a space enclosed by the fourth case part 42 and the fifth case part 43. A part of the output gear 21, the input gear 22, and the idle gear 23 are disposed in a space enclosed by the third case part 41 and the fourth case part 42.

The third case part 41 has a third side wall 41A, a first gear support part 41B, a second gear support part 41C, a third gear support part 41D, and the second positioning part 41E (see FIG. 5B). Among outer surfaces of the auxiliary tape case 45, the third side wall 41A constitutes a side surface, which is continuous with the side surface of the printing tape case 35.

The first gear support part 41B supports the output gear 21 such that the output gear 21 is rotatable. The second gear support part 41C supports the input gear 22 such that the input gear 22 is rotatable. The third gear support part 41D supports the idle gear 23 such that the idle gear 23 is rotatable.

The second positioning part 41E illustrated in FIG. 5B is provided on a second coupling surface 45B. The second coupling surface 45B opposes and contacts the printing tape cassette 30 positioned above the second coupling surface 45B while the auxiliary tape case 45 is inserted in the cassette accommodation part 101.

Among the outer surfaces of the auxiliary tape case 45, the second coupling surface 45B is a flat surface that crosses (specifically, that is orthogonal to) the up-down direction and that is parallel to the first coupling surface 35C of the printing tape case 35. The printing tape cassette 30 can be arranged on the second coupling surface 45B.

The second positioning part 41E is a cylindrical or columnar part that protrudes upward from the second coupling surface 45B. When the auxiliary tape cassette 40 and the printing tape cassette 30 are coupled together, the auxiliary tape cassette 40 is positioned relative to the printing tape cassette 30 in the front-rear direction and the left-right direction by the second positioning part 41E being inserted into the first positioning part 32C of the printing tape case 35.

The fourth case part 42 illustrated in FIG. 4 has a fourth side wall 42A, the head opening 42B, a second discharge opening 42C (an example of the discharge opening), an inner guide wall 42D, a first restricting part 42E, and a ceiling wall 42F. Among the outer surfaces of the auxiliary tape case 45, the fourth side wall 42A constitutes a side surface that circumferentially surrounds the ink ribbon roll 14. The ceiling wall 42F and the inner guide wall 42D are examples of the wall of the case.

The head opening 42B is a cutout formed in a part of the fourth side wall 42A. The head opening 42B is a space in which the printing head 102 is placed in a state where the printing cassette 10 is attached to the printing device body 100.

In the head opening 42B, printing is performed on the printing tape 11A by the printing head 102. The head opening 42B is open in a lower portion of the auxiliary tape cassette 40 so that the printing head 102 can be inserted thereinto from below.

The printing tape 11A and the ink ribbon 14A are passed over the head opening 42B in the left-right direction. The printing tape 11A is exposed in the head opening 42B at a position upstream relative to the second discharge opening 42C in a discharging direction of the printing tape 11A.

The second discharge opening 42C discharges the printing tape 11A on which printing has been performed to an outside of the printing cassette 10. That is, the second discharge opening 42C discharges the printing tape 11A from an inside of the auxiliary tape case 45 to the outside therethrough. The printed printing tape 11A is discharged to an outside of the printing device through the second discharge opening 42C.

The inner guide wall 42D is a plate-like part having a front surface that guides the printing tape 11A (i.e., contacts the printing tape 11A from the rear) along the left-right direction inside the auxiliary tape case 45. The inner guide wall 42D constitutes a part of a second guide surface 45A that guides the printing tape 11A toward the second discharge opening 42C.

The inner guide wall 42D is continuously provided from the fourth side wall 42A. Additionally, the inner guide wall 42D is disposed upstream of the head opening 42B in the discharging direction of the printing tape 11A and further frontward than the head opening 42B.

At least a part of the inner guide wall 42D is disposed at the same position as the second discharge opening 42C in the up-down direction. That is, at least a part of the inner guide wall 42D is overlapped with the second discharge opening 42C in a direction orthogonal to the up-down direction. The printing tape 11A is conveyed on the inner guide wall 42D in a direction orthogonal to the up-down direction (specifically, in the left-right direction).

The first restricting part 42E restricts movement of the printing tape 11A in a width direction thereof when the printing tape 11A is conveyed along the second guide surface 45A configured by the inner guide wall 42D. Specifically, the first restricting part 42E is disposed above the inner guide wall 42D and has a lower surface that is orthogonal to the up-down direction.

The ceiling wall 42F is disposed frontward of the inner guide wall 42D to be spaced apart from the inner guide wall 42D. The ceiling wall 42F and the inner guide wall 42D constitute therebetween a conveying path for the printing tape 11A. The ceiling wall 42F is connected to the first restricting part 42E. An inner surface (i.e., a rear surface) of the ceiling wall 42F constitutes a restricting surface that is arranged to oppose the inner guide wall 42D.

The fifth case part 43 has a fifth side wall 43A, and a second restricting part 43B. Together with the fourth side wall 42A of the fourth case part 42, the fifth side wall 43A constitutes the side surface of the auxiliary tape case 45 that circumferentially surrounds the ink ribbon roll 14.

The second restricting part 43B restricts movement of the printing tape 11A in the width direction thereof in cooperation with the first restricting part 42E when the printing tape 11A is conveyed along the second guide surface 45A. Specifically, the second restricting part 43B is disposed below the inner guide wall 42D of the fourth case part 42 and has an upper surface that is orthogonal to the up-down direction. The second restricting part 43B opposes the first restricting part 42E of the fourth case part 42 in the up-down direction.

The inner guide wall 42D, the ceiling wall 42F, the first restricting part 42E, and the second restricting part 43B configure an arm part 45C, as illustrated in FIG. 2B. The arm part 45C has a space through which the printing tape 11A passes when the printing tape 11A is conveyed along the second guide surface 45A of the auxiliary tape case 45.

The arm part 45C constitutes a tunnel-like part that encompasses the printing tape 11A in the width direction and a thickness direction thereof. An entrance for the printing tape 11A in the arm part 45C constitutes an insertion opening 45F through which the printing tape 11A supplied from the printing tape cassette 30 is inserted to the inside of the auxiliary tape case 45.

Within the arm part 45C, the inner guide wall 42D and the ceiling wall 42F restrict movement of the printing tape 11A in the front-rear direction (i.e., the thickness direction) and the first restricting part 42E and the second restricting part 43B restrict movement of the printing tape 11A in the up-down direction (i.e., the width direction). The printing tape 11A that has passed through the arm part 45C is supplied to the head opening 42B.

As illustrated in FIGS. 2A and 2B, a part of the side surface of the auxiliary tape case 45 constitutes the second guide surface 45A, which guides the printing tape 11A supplied from an outside of the auxiliary tape case 45 (i.e., from the printing tape cassette 30) toward the second discharge opening 42C. The printing tape 11A guided by the first guide surface 35A of the printing tape case 35 is further guided toward the second discharge opening 42C by the second guide surface 45A.

The guide part 46 guides the printing tape 11A supplied from the outside of the auxiliary tape case 45 toward the second discharge opening 42C. The guide part 46 has the second guide surface 45A, the arm part 45C, the insertion opening 45F, and a curvature forming member 45H (see FIG. 6).

The insertion opening 45F is provided in an insertion side surface 45G of the auxiliary tape case 45. Among the outer surfaces of the auxiliary tape case 45, the insertion side surface 45G is a surface that crosses the left-right direction (specifically, is parallel to the up-down direction) and that is arranged at a position that is not overlapped with the ink ribbon roll 14 in the up-down direction (specifically, arranged frontward of the ink ribbon roll 14). The printing tape 11A is inserted rightward through the insertion opening 45F.

Figure 6:
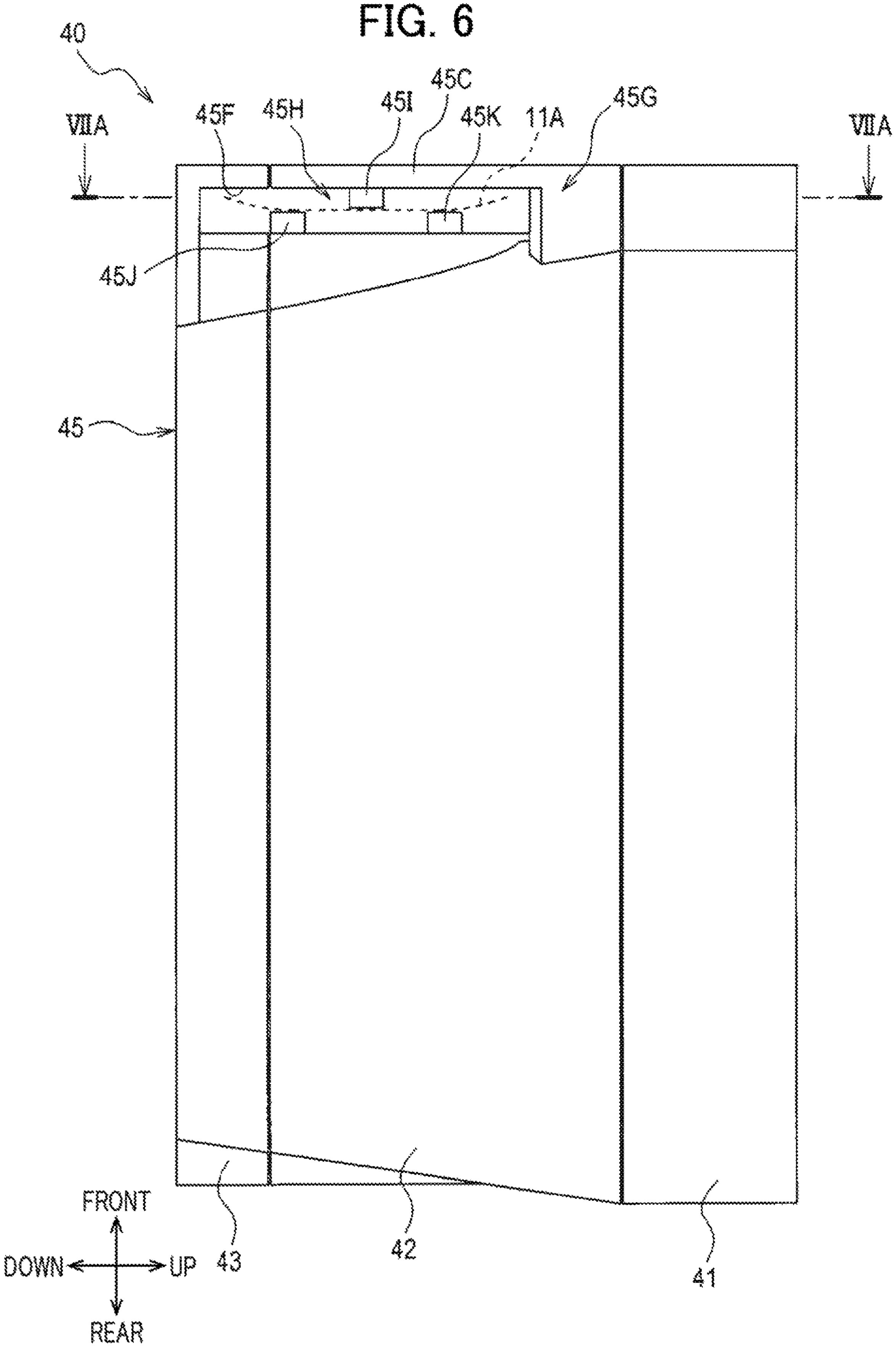
FIG. 6 is a schematic side view of the auxiliary tape cassette of FIG. 5A.

The curvature forming member 45H illustrated in FIG. 6 causes the printing tape 11A to be curved so that a portion in the width direction of the printing tape 11A is distended in the thickness direction by contacting the printing tape 11A.

In the present embodiment, the curvature forming member 45H causes the printing tape 11A to be curved so that a center portion in the width direction of the printing tape 11A is distended rearward. Inside the arm part 45C, the printing tape 11A is conveyed while a printing surface (i.e., a front surface on which the ink ribbon 14A is to be superimposed) is on the rear side, and a non-printing surface (i.e., a back surface opposite the printing surface) is on the front side.

Hence, the printing tape 11A is curved in the thickness direction so that the printing surface is on the outside, and the non-printing surface is on the inside. The printing tape 11A passes through the arm part 45C while the printing tape 11A is curved in this way.

Curved in this way, the printing tape 11A obtains greater strength against bending from external forces acting in the thickness direction and buckling from external forces acting in a longitudinal direction (i.e., a conveying direction), which occur when the printing tape 11A impacts an inner surface of the auxiliary tape case 45.

Figure 7A:
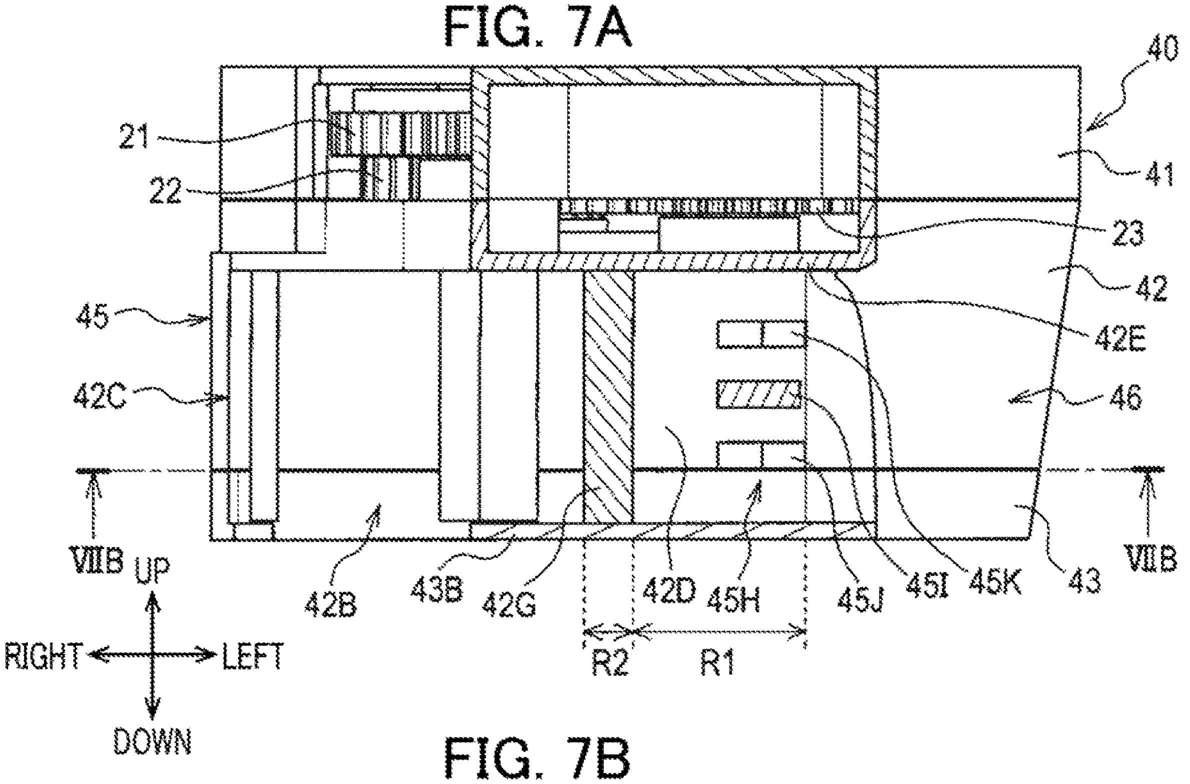
FIG. 7A is a schematic cross-sectional view taken along line VIIA-VIIA of FIG. 6.
Figure 7B:
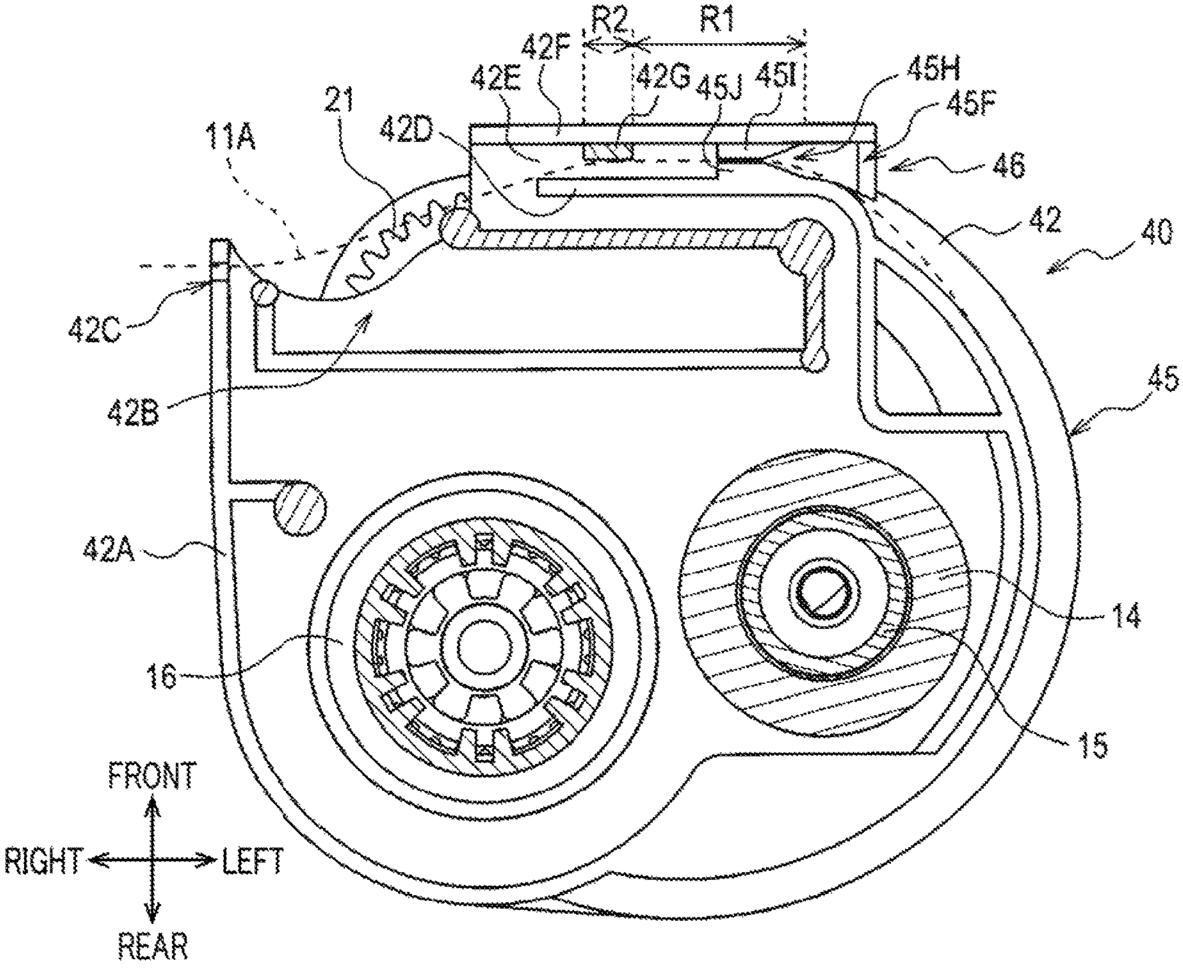
FIG. 7B is a schematic cross-sectional view taken along line VIIB-VIIB of FIG. 7A.

As illustrated in FIGS. 7A and 7B, in the arm part 45C, the guide part 46 has a first conveying path R1, and a second conveying path R2.

The first conveying path R1 conveys the printing tape 11A continuously from the insertion opening 45F. On the first conveying path R1, the printing tape 11A passes between the ceiling wall 42F and the inner guide wall 42D. The first conveying path R1 constitutes a straight part within the tunnel-like part (i.e., the arm part 45C) for conveying the printing tape 11A in a straight line.

The second conveying path R2 conveys the printing tape 11A at a position downstream of the first conveying path R1 in the discharging direction of the printing tape 11A. The second conveying path R2 has a width in the thickness direction of the printing tape 11A smaller than that of the first conveying path R1.

The width of the second conveying path R2 in the thickness direction of the printing tape 11A is reduced by a protruding part 42G that protrudes rearward from the ceiling wall 42F. On the second conveying path R2, the printing tape 11A passes between the protruding part 42G and the inner guide wall 42D.

The curvature forming member 45H is provided at the insertion opening 45F, and at the first conveying path R1 (i.e., the straight part) within the arm part 45C. The curvature forming member 45H contacts in the thickness direction of the printing tape 11A the printing surface and the non-printing surface of the printing tape 11A guided by the guide part 46 and presses these surfaces. Specifically, the curvature forming member 45H has a first contact part 451, a second contact part 45J, and a third contact part 45K.

The first contact part 451 is a rib that protrudes in the thickness direction of the printing tape 11A (specifically, rearward) from the ceiling wall 42F. The first contact part 451 contacts a center portion in the width direction of the non-printing surface of the printing tape 11A.

An amount that the first contact part 451 protrudes rearward is increased toward a downstream side in the discharging direction of the printing tape 11A. In other words, the first contact part 451 has a sloped surface extending from the left front toward the right rear.

Each of the second contact part 45J and the third contact part 45K is a rib that protrudes in the thickness direction of the printing tape 11A (specifically, frontward) from the inner guide wall 42D. The second contact part 45J and the third contact part 45K are arranged to be spaced apart from each other in the width direction of the printing tape 11A (i.e., the up-down direction).

The second contact part 45J contacts one end portion (specifically, a lower end portion) in the width direction of the printing surface of the printing tape 11A. The third contact part 45K contacts another end portion (specifically, an upper end portion) in the width direction of the printing surface of the printing tape 11A.

An amount that the second contact part 45J and the third contact part 45K protrude frontward is increased toward the downstream side in the discharging direction of the printing tape 11A. In other words, each of the second contact part 45J and the third contact part 45K has a sloped surface extending from the left rear toward the right front.

The first contact part 451 is arranged between the second contact part 45J and the third contact part 45K in the width direction of the printing tape 11A (i.e., the up-down direction). Further, the first contact part 451, the second contact part 45J, and the third contact part 45K are arranged at the same positions in the discharging direction of the printing tape 11A.

Therefore, when the printing tape 11A is inserted into the arm part 45C, a leading edge of the printing tape 11A contacts the first contact part 451, the second contact part 45J, and the third contact part 45K simultaneously.

<Conveyance and Printing of Printing Tape with Printing Device Body>

When the printing cassette 10 is attached to the printing device body 100, the printing tape 11A is wrapped around the first guide surface 35A of the printing tape case 35 and the second guide surface 45A of the auxiliary tape case 45 to form a spiral portion 11B.

The spiral portion 11B of the conveyed printing tape 11A is wrapped across the side surface of the printing tape case 35 and the side surface of the auxiliary tape case 45. Specifically, the spiral portion 11B extends from the first discharge opening 35B of the printing tape case 35 to the insertion opening 45F.

When the printing cassette 10 is attached to the printing device body 100 with the printing tape 11A wrapped around the guide surfaces in this way, the printing head 102 is arranged in the head opening 42B at a position overlapped with the printing tape 11A and the ink ribbon 14A in the front-rear direction.

The printing tape 11A is conveyed to the head opening 42B by the platen roller 103 and is pressed against the printing head 102 through the ink ribbon 14A by the platen roller 103 while the heating elements of the printing head 102 generate heat. As a result, some ink provided on a surface of the ink ribbon 14A is transferred onto the printing tape 11A, whereby characters, symbols, and the like are printed on the printing tape 11A.

The platen roller 103 conveys the printed printing tape 11A from an inside of the printing cassette 10 toward the outside of the printing cassette 10. The platen roller 103 is rotated by the platen gear 104, which is engaged with the output gear 21. The platen roller 103 and the platen gear 104 is pivotally movable between a position in which the platen roller 103 and the platen gear 104 are separated from the printing cassette 10 and a position in which the platen gear 104 is engaged with the output gear 21.

While the auxiliary tape case 45 of the printing cassette 10 is inserted into the cassette accommodation part 101, the drive shaft 105 is engaged with the input gear 22 and the platen gear 104 is engaged with the output gear 21.

Specifically, while the drive shaft 105 is inserted into the take-up spool 16 and the input gear 22 of the printing cassette 10, the platen gear 104 is engaged with the output gear 21 by pivotal movement of the platen roller 103 and the platen gear 104 toward the head opening 42B of the printing cassette 10.

With the printing cassette 10 in its attached state, the output gear 21 is rotated when the drive shaft 105 rotates the input gear 22. Further, the platen gear 104 is rotated by the rotation of the output gear 21, and the platen roller 103 is rotated by the rotation of the platen gear 104.

Modification of First Embodiment

Figure 8:
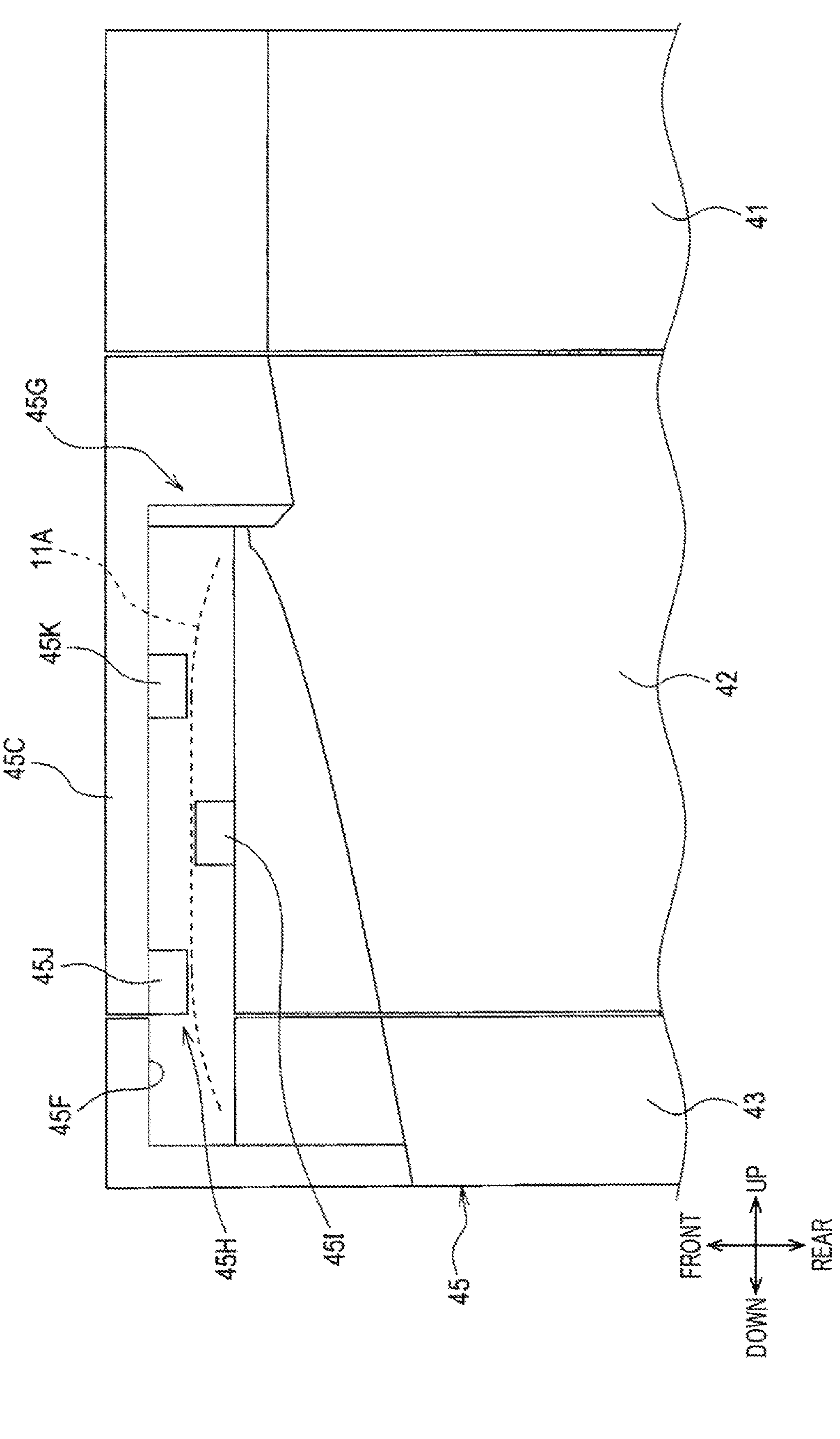
FIG. 8 is a schematic side view of an auxiliary tape cassette.

With the curvature forming member 45H of the present embodiment, the first contact part 451 may protrude frontward from a rear surface inside the arm part 45C, and the second contact part 45J and the third contact part 45K may protrude rearward from a front surface inside the arm part 45C, as illustrated in FIG. 8.

In other words, the first contact part 451 may contact the printing surface of the printing tape 11A, and the second contact part 45J and the third contact part 45K may contact the non-printing surface of the printing tape 11A. In this case, the printing tape 11A is curved by the curvature forming member 45H so that the center portion in the width direction of the printing tape 11A is distended frontward. That is, the printing tape 11A is curved in the thickness direction so that the printing surface is on the inside and the non-printing surface is on the outside.

1-2. Effects

The following effects can be obtained according to the embodiment described above.

(1a) Since the printing tape 11A is curved using the curvature forming member 45H so that a portion in the width direction of the printing tape 11A is distended, a secondary moment in a cross section orthogonal to the longitudinal direction of the printing tape 11A is increased. Accordingly, rigidity of the printing tape 11A is improved, thereby making it relatively easy to insert the printing tape 11A into the auxiliary tape cassette 40.

(1b) By providing the curvature forming member 45H at the insertion opening 45F, the printing tape 11A can be curved simultaneously with insertion of the printing tape 11A into the auxiliary tape cassette 40. Consequently, the insertion of the printing tape 11A can be performed more easily.

(1c) By providing the curvature forming member 45H at the first conveying path R1, the printing tape 11A can be curved before the width of the conveying path is reduced. Therefore, deformation of the printing tape 11A can be suppressed when insertion of the printing tape 11A is performed and when the leading edge of the printing tape 11A impacts an inner surface of the second conveying path R2 (e.g., the protruding part 42G).

(1d) Since the curvature forming member 45H contacts at least one of the printing surface and the non-printing surface of the printing tape 11A, the printing tape 11A can be curved relatively easily and accurately.

(1e) By providing the curvature forming member 45H in the straight part of the arm part 45C, the printing tape 11A can be curved with no kinks. Hence, the printing tape 11A can be curved relatively easily and accurately.

(1f) Since the curvature forming member 45H has the first contact part 451, the second contact part 45J, and the third contact part 45K, the curvature forming member 45H can deform the printing tape 11A into a curved shape having relatively high rigidity.

The first contact part 451, the second contact part 45J, and the third contact part 45K can also exert suitable conveying resistance on the printing tape 11A. Thus, this arrangement suppresses the printing tape 11A from being pulled inward when printing is not performed, and from falling out of the auxiliary tape cassette 40 when the printing cassette 10 is attached to the printing device body 100.

(1g) The sloped surfaces of the first contact part 451, the second contact part 45J, and the third contact part 45K can guide the printing tape 11A into a portion between these contact parts. As a result, these contact parts can easily cause the printing tape 11A to be curved.

2. OTHER EMBODIMENTS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(2a) The printing device in the above embodiments is not limited to a device that performs printing using an ink ribbon. In place of the printing tape, the printing device may use a strip of heat-sensitive paper. In this case, the auxiliary tape may be a laminated tape, for example.

Figure 9A:
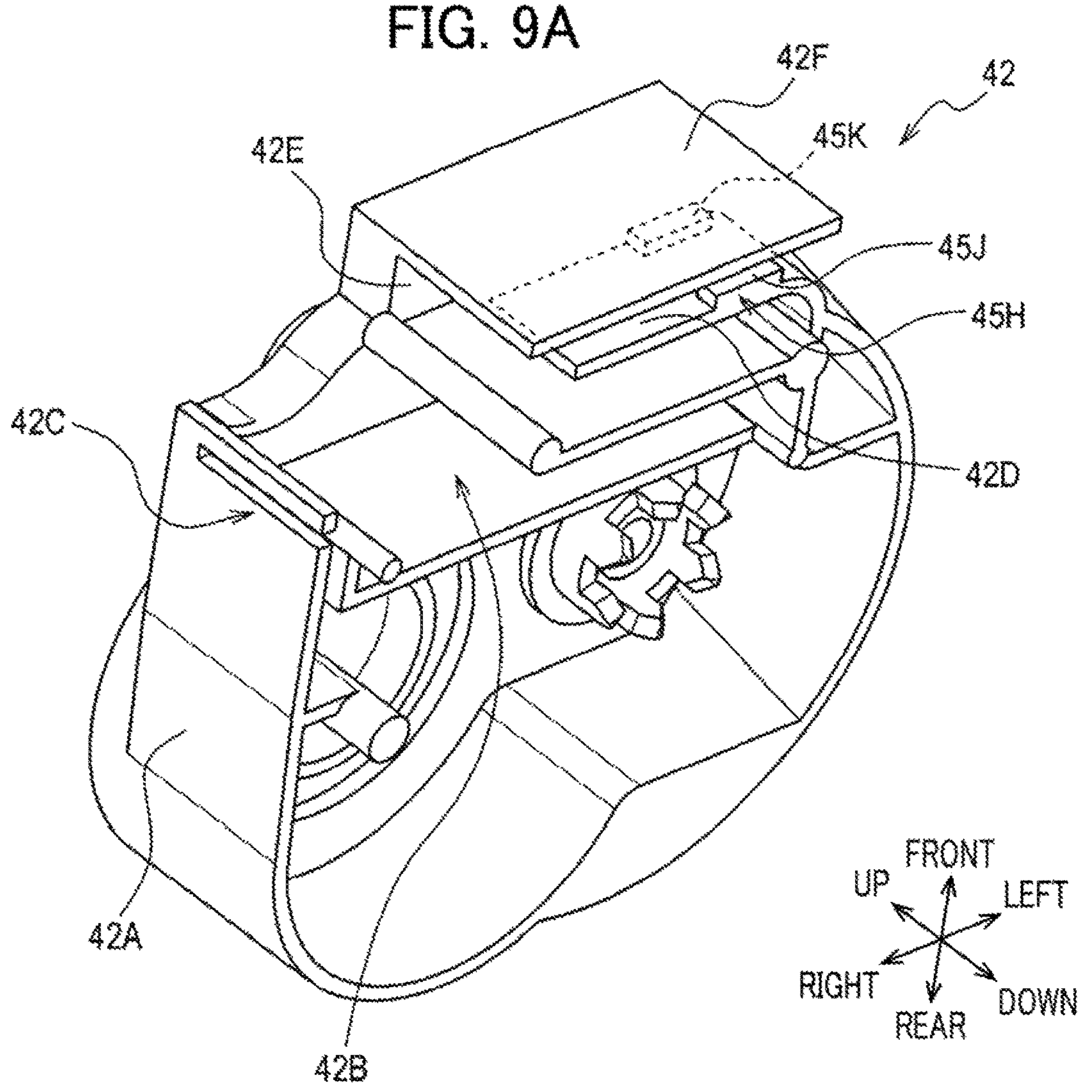
FIG. 9A is a schematic perspective view of a fourth case part in an auxiliary tape cassette.
Figure 9B:
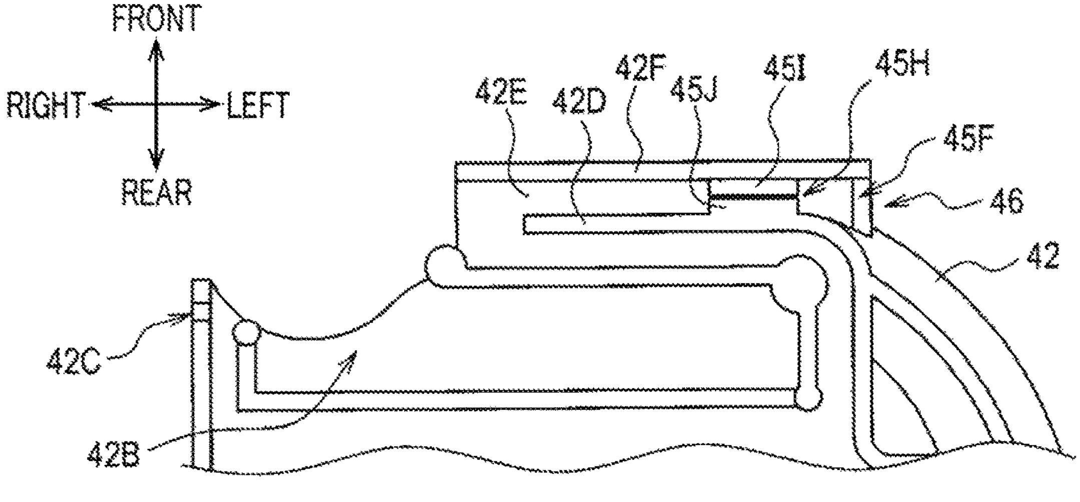
FIG. 9B is a schematic plan view of the fourth case part of FIG. 9A.

(2b) In the auxiliary tape cassette according to the above embodiment, the first contact part, the second contact part, and the third contact part need not have the sloped surfaces. That is, as illustrated in FIGS. 9A and 9B, the first contact part 451, the second contact part 45J, and the third contact part 45K may be configured of ribs whose protruding amount in the front-rear direction is constant.

Figure 10:
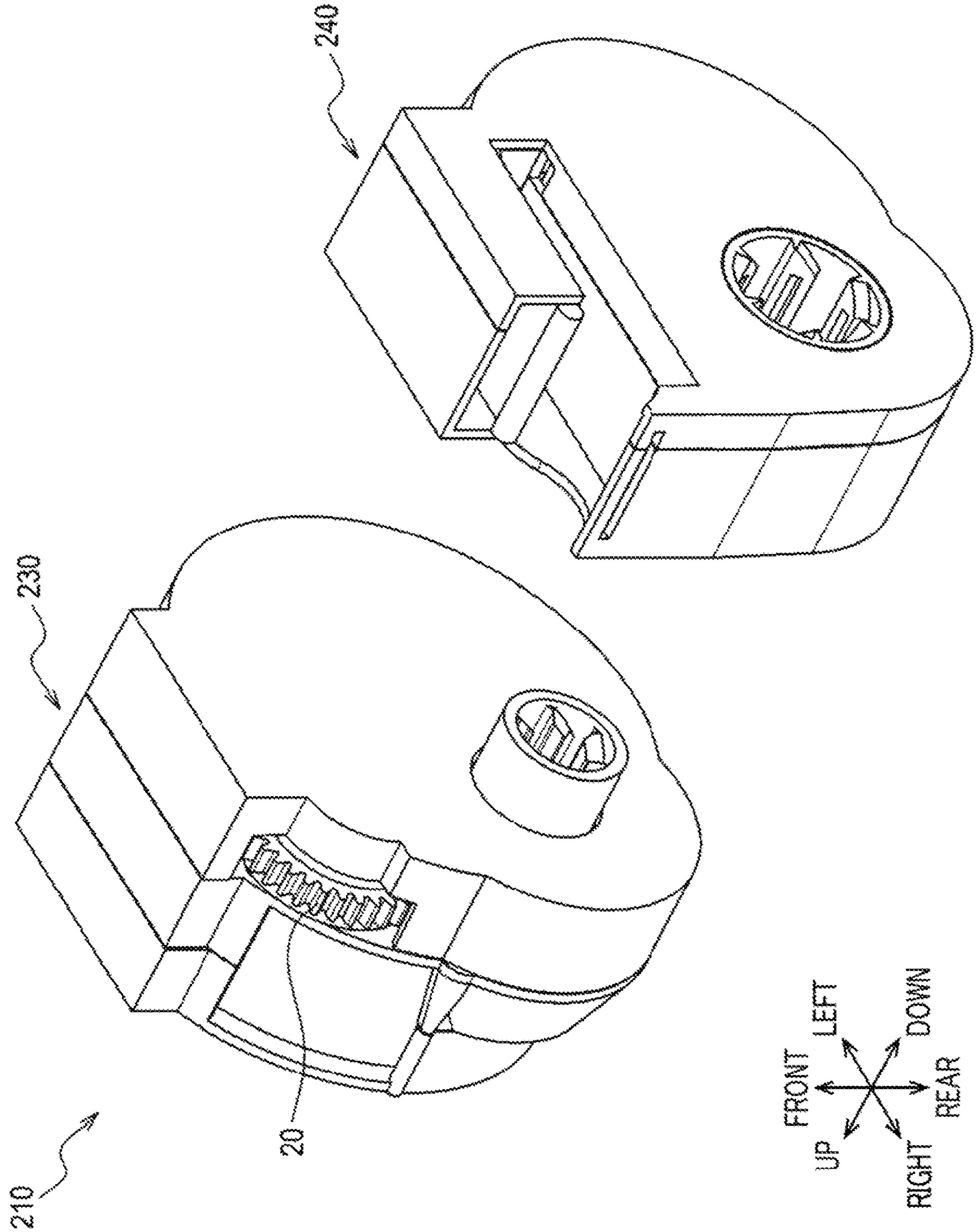
FIG. 10 is a schematic perspective view of a printing cassette.

(2c) The auxiliary tape cassette according to the above embodiment need not include the drive transmission unit. For example, a printing cassette 210 illustrated in FIG. 10 is configured of a printing tape cassette 230 that includes a drive transmission unit 20, and an auxiliary tape cassette 240 that does not include the drive transmission unit 20. Alternatively, the printing cassette may include a gear cassette that includes a drive transmission unit and is independent from the printing tape cassette and the auxiliary tape cassette.

(2d) In the auxiliary tape cassette according to the above embodiment, the curvature forming member need not include the first contact part, the second contact part, and the third contact part. For example, the curvature forming member may be configured of an insertion opening itself whose width is smaller than a width of the printing tape (i.e., the printing tape cannot be inserted therethrough as long as the printing tape is not curved). The insertion opening serving as the curvature forming member may have a shape along with a cross-sectional shape of the curved printing tape.

(2e) Functions possessed by a single component in the embodiments described above may be distributed among a plurality of components, and functions possessed by a plurality of components may be integrated into a single component. Additionally, a part of the structures in the embodiments described above may be omitted. Further, at least a part of the structures in the embodiments described above may be added to or used in place of structures in other embodiments. All aspects included in the technical concepts identified from descriptions in the claims are embodiments of the present disclosure.

What is claimed is:

1. An auxiliary tape cassette comprising:
an auxiliary tape used for printing on a printing tape; and
a case that accommodates therein at least a part of the auxiliary tape,
wherein the case has:
a discharge opening configured to allow the printing tape to be discharged to an outside of the case; and
a guide part that guides the printing tape supplied from the outside of the case toward the discharge opening, and
wherein the guide part has a curvature forming member that causes the printing tape to be curved such that a portion in a width direction of the printing tape is distended in a thickness direction by contacting the printing tape.

2. The auxiliary tape cassette according to claim 1,
wherein the guide part has an insertion opening through which the printing tape is inserted to an inside of the case, and
wherein the curvature forming member is provided at the insertion opening.

3. The auxiliary tape cassette according to claim 1,
wherein the guide part has:
a first conveying path that conveys the printing tape; and
a second conveying path that conveys the printing tape at a position downstream of the first conveying path in a discharging direction of the printing tape, the second conveying path having a width in the thickness direction of the printing tape smaller than a width of the first conveying path, and
wherein the curvature forming member is provided at the first conveying path.

4. The auxiliary tape cassette according to claim 1,
wherein the curvature forming member contacts at least one of a front surface and a back surface of the printing tape guided by the guide part.

5. The auxiliary tape cassette according to claim 4,
wherein the curvature forming member has:
a first contact part that contacts the front surface of the printing tape; and
a second contact part and a third contact part that contact the back surface of the printing tape, and
wherein the first contact part is arranged between the second contact part and the third contact part in the width direction of the printing tape.

6. The auxiliary tape cassette according to claim 5,
wherein the first contact part, the second contact part, and the third contact part are arranged at the same positions in a discharging direction of the printing tape.

7. The auxiliary tape cassette according to claim 5,
wherein each of the first contact part, the second contact part, and the third contact part is a rib that protrudes in the thickness direction of the printing tape from a wall of the case, and
wherein an amount that each of the first contact part, the second contact part, and the third contact part protrudes is increased toward a downstream side in a discharging direction of the printing tape.

8. The auxiliary tape cassette according to claim 5,
wherein the back surface of the printing tape is a printing surface.

9. The auxiliary tape cassette according to claim 5,
wherein the front surface of the printing tape is a printing surface.

10. The auxiliary tape cassette according to claim 1,
wherein the guide part has a tunnel-like part that encompasses the printing tape being guided in the width direction and the thickness direction, and
wherein the curvature forming member is provided at the tunnel-like part.

11. The auxiliary tape cassette according to claim 10,
wherein the tunnel-like part has a straight part that conveys the printing tape in a straight line, and
wherein the curvature forming member is provided at the straight part.

* * * * *